3,788,872
METHOD OF EMBOSSING
Daniel M. Sigman, Jr., Strasburg, Pa., assignor to
Armstrong Cork Company, Lancaster, Pa.
Filed Nov. 8, 1971, Ser. No. 196,394
Int. Cl. B44c 1/02
U.S. Cl. 117—10             9 Claims

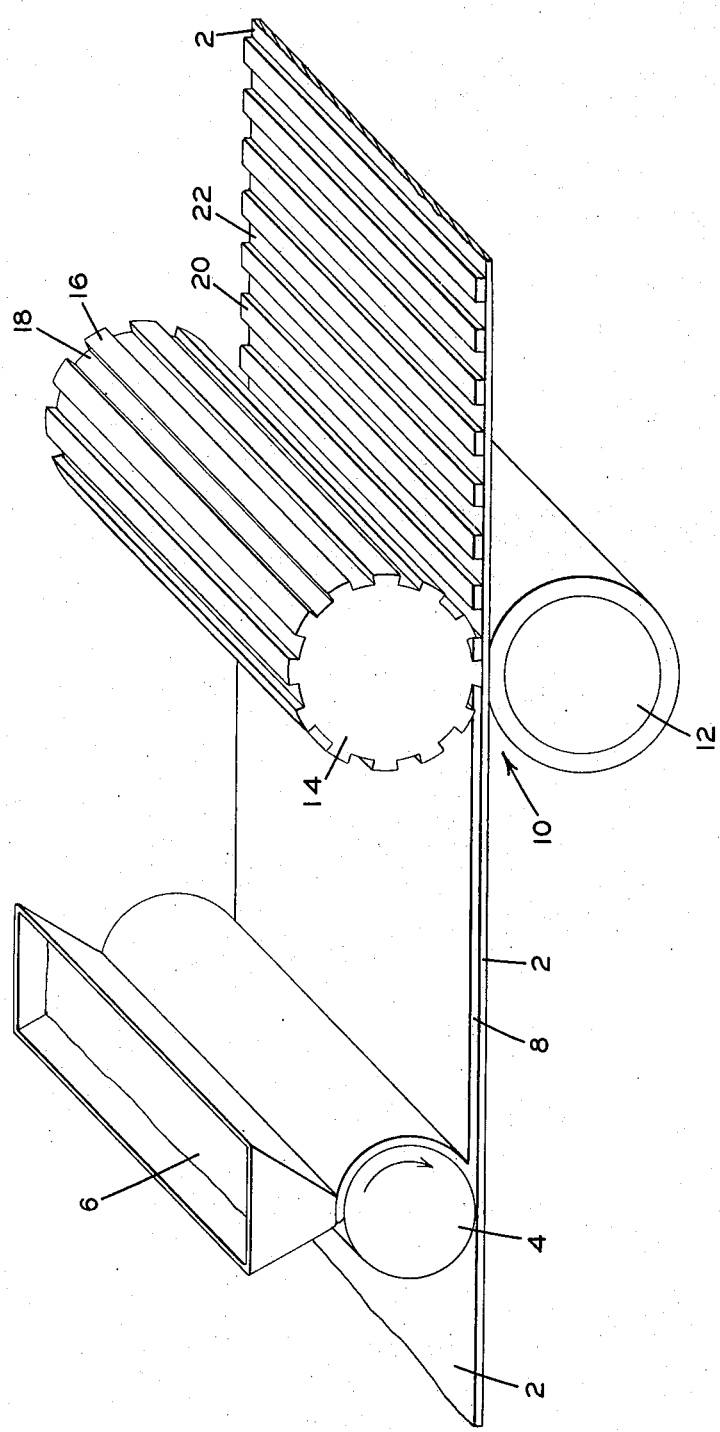

ABSTRACT OF THE DISCLOSURE

A layer of liquid material is placed on a backing sheet. The backing sheet and liquid layer pass through an embossing structure which fuses or gels the liquid layer to place it in a solid or semi-solid state. The raised areas of the embossing roll press down against the liquid layer and engage the backing sheet to form areas where the liquid has been completely squeezed out from between the backing sheet and the raised area of the embossing roll.

BACKGROUND OF THE INVENTION

Field of the invention

The invention relates to an embossing technique and, more particularly, to an embossing technique for embossing liquid or liquid-like materials.

Description of the prior art

Generally, the technique for embossing a plastic material is old and well established in the art. During the embossing technique, the plastic material is deformed to cause it to take on the shape of the surface of the embossing roll. Normally, the plastic material being embossed is in a solid state or a gelled state. Normally, the embossing is not done to a depth such that the material being embossed is completely removed from certain areas of the carrier for the material to be embossed. That is, normally the material to be embossed would be carried on some type of carrier structure and, even after the embossing is performed, the total surface of the carrier would be still covered by some of the material which has been embossed. In those cases there a carrier is not used and material is embossed, there normally is never any attempt made to completely remove sections of the material being embossed during the embossing operation.

Herein is a method for bottoming out a plastic sheet when it is embossed with a design texture. By this is meant that the embossing operation displaces the plastic material to such a point that at certain points under the embossing roll the plastic material is completely squeezed out from under these points of the embossing roll.

SUMMARY OF THE INVENTION

The invention is carried out by coating a controlled quantity of plastisol onto a carrier. This wet layup of plastisol is passed between an embossing roll and a rubber impression roll. The embossing roll is heated, and it is heated to such a temperature that the plastisol will gel on contact with the embossing roll. However, gelling does not occur before the wet layup of material has had a chance to fully conform to the embossing roll. The raised areas of the embossing roll are such that they press down into the wet layup to the extent that, in those raised areas, the wet layup is squeezed completely out from between the raised areas of the embossing roll and the surface of the carrier. This results in a condition wherein the plastisol has been removed from certain portions of the carrier surface. Further heating may result in complete fusion of the plastisol.

The technique can also be employed to produce individually shaped components. The carrier used would be precoated with a strippable material, and after fusion and cooling, the carrier would be scraped, removing the islands of material left by the embossing.

BRIEF DESCRIPTION OF THE DRAWING

The sole figure of the drawing is a perspective view of the apparatus for carrying out the inventive method herein.

DESCRIPTION OF THE PREFERRED EMBODIMENT

Referring to the drawing, therein is shown the apparatus for carrying out the inventive method herein. Any conventional carrier material 2 is passed below a roll applicator coater 4. A reservoir 6 feeds the plastisol to the roll coater, and the roll coater deposits a wet layup of plastisol 8 on the carrier 2. The wet plastisol is sufficiently viscous that it will not run off the sheet, but will stay on the carrier sheet. The plastisol and carrier then pass to an embossing dual roll structure 10.

The lower roll 12 is a rubber-covered back-up roll which is positioned against the back surface of the carrier. The upper roll 14 is the embossing roll, and it has a pattern thereon that provides it with lands 16 and grooves 18. The embossing roll is heated to such a temperature as to cause the plastisol to gel on contact. However, the gelling does not occur before the wet layup has a chance to fully conform to the contours of the embossing roll.

In the embodiment shown, the embossing roll 14 is provided with a plurality of grooves 18 and lands or raised areas 16. When the raised areas 16 press down into the wet layup of plastisol, all the plastisol is squeezed out from between the raised areas 16 and the upper surface of the carrier 2. However, plastisol will be permitted to stay on the carrier in those areas where the groove 18 of the embossing roll is adjacent the carrier. This results in the formation on the carrier 2 of a plurality of bar-like elements 20 which are formed by the grooves 18. The spacing 22 between the bar elements 20 are the points where the raised area 16 pressed fully down against the upper surface of the carrier 2. Here, no plastisol was permitted to remain.

Now if the embossing roll had been made with a grid-type pattern, you would have had a plurality of pockets which bottomed out or went all the way down to the upper surface of the carrier 2. The grooved areas of a grid pattern would then provide for an open grid network being formed from the plastisol. In the embodiment shown, where a plurality of bars are formed, these are separated from each other. Therefore, if the carrier were used with a precoating of a stippable material, the bars then later on could be stripped from the carrier 2 and form a plurality of individually shaped components. Naturally, in the grid pattern, the structure would be so arranged that the grid would remain as a unitary structure should it be stripped from the carrier. It is not necessary that the structure be stripped from the carrier, but the carrier could remain as part of the finished product. The plastisol could be permitted to remain as the finished surface, or the depressed pocket areas of the plastisol could be used to receive other components to form different items, for example, a decorative floor surface.

After the plastisol has been gelled on contact with the embossing roll, the carrier with the formed plastisol thereon can then be placed in a heat tunnel or some other heating structure to complete the fusion of the plastisol. During the operation of the embossing roll, it is important to control the heat of the roll and the time of contact. These must be balanced so that the plastisol will gel on contact, but not before the wet layup of plastisol has had a chance to fully conform to the contours of the embossing roll. If there is too short a time of contact, there will be incomplete gelling, and the plastisol will not hold its embossed shape. Too long a time may cause a tendency for the gelled plastisol to stick to the embossing roll.

In one working embodiment of the invention, the following plastisol was laid by the roll coater to a thickness of .025 inch on a carrier:

CLEAR POLYVINYL CHLORIDE PLASTISOL

| | Parts by wt. |
|---|---|
| Dispersion grade PVC homopolymer resin | 100.0 |
| Dioctyl phthalate plasticizer | 40.0 |
| Octyl epoxy tallate stabilizer | 5.0 |
| Resin stabilizer—barium cadmium zinc phosphite | 3.0 |

The embossing roll was heated to 280° F. and run at a speed of 2.6 revolutions per minute while the carrier was moving at a speed of 8 feet per minute. This provided a good balance between roll heat and contact time so as to form a product wherein there was a bottoming out of the wet layup of plastisol on the carrier. The sheet was then transferred to a heat tunnel for 1.2 minutes at 420° F. to complete the fusion of the plastisol.

What is claimed is:

1. A method for producing a sheet wherein there has been a bottoming out of the surface being embossed, comprising the steps of applying a coating of viscous material to one side of a non-porous carrier, passing the carrier and coating of viscous material to an embossing structure composed of a back-up roller and an embossing roller, contacting the layup of viscous material with the embossing roll which has been heated, passing the carrier and viscous layer thereon between the heated embossing roll and back-up roll to cause the raised areas of the heated embossing roll to pass completely through the viscous layer to the carrier and at the same time to partially solidify the viscous layer so that it will retain its embossed shape, and controlling the embossing roll temperature and contact time with the viscous material so as to cause the viscous material to assume the contour of the embossing roll and to gel to result in a relatively solid formed pattern on the carrier wherein certain parts of the carrier are covered by the solid formed materials and other parts of the carrier have none of the solid formed material thereabove.

2. The method of claim 1 wherein the embossing roll has a pattern that provides an open grid network in the gelled viscous material.

3. The method of claim 2 wherein the carrier is provided with a precoating of a strippable material and the gelled and embossed viscous material is stripped from the carrier.

4. The method of claim 1 wherein the embossing roll has a pattern that provides a plurality of elements formed from the gelled viscous material, which elements are separated from each other.

5. The method of claim 4 wherein the carrier is provided with a precoating of a strippable material and the gelled and embossed viscous material elements are stripped from the carrier to provide a plurality of individually shaped elements.

6. A method for gelling and embossing a viscous material wherein the embossing is carried out with a bottoming out of the embossing, comprising the steps of: applying a coating of viscous material to the upward facing side of a carrier, passing the carrier with its coating of viscous material to an embossing structure which has raised embossing areas, heating the embossing structure, contacting the coating of viscous material with the heated embossing structure, pressing the raised embossing areas of the heated embossing structure into and through the vsicous material so that the raised areas of the embossing structure pass completely through the viscous material to the surface of the carrier carrying the viscous material, gelling the viscous material at the same time that the embossing is carried out, due to the use of a heated embossing structure so that the embossed viscous layer will retain its embossed shape, and controlling the embossing roll temperature and contact time with the viscous material so as to cause the viscous material to assume the contour of the embossing structure and to gel at the same time to result in a relatively solid, patterned, embossed material on the carrier wherein certain parts of the upward facing carrier surface are covered with a solid formed material and other parts of the upward facing carrier surface have none of the solid formed material thereabove.

7. The method of claim 6 wherein the carrier is provided with a precoating of a strippable material and the gelled and embossed viscous material is stripped from the carrier.

8. The method of claim 7 wherein the embossing structure has a pattern that provides an open area pattern in the gelled viscous material.

9. The method of claim 7 wherein the embossing structure has a pattern that provides a plurality of elements formed from the gelled viscous material, which elements are separated from each other.

References Cited

UNITED STATES PATENTS

| | | | |
|---|---|---|---|
| 3,307,961 | 3/1967 | Stiehl et al. | 117—11 X |
| 3,338,731 | 8/1967 | Sommer | 264—293 X |
| 3,478,141 | 11/1969 | Dempsey et al. | 264—293 X |
| 3,506,749 | 4/1970 | Weissman | 264—293 X |
| 3,584,110 | 6/1971 | Blaszkow | 264—293 |

WILLIAM D. MARTIN, Primary Examiner

T. G. DAVIS, Assistant Examiner

U.S. Cl. X.R.

117—11, 65.2